United States Patent [19]
Lee

[11] Patent Number: 5,165,332
[45] Date of Patent: Nov. 24, 1992

[54] BALE DENSITY MONITORING APPARATUS AND METHOD

[75] Inventor: Curtiss M. Lee, West Bend, Wis.
[73] Assignee: Gehl Company, West Bend, Wis.
[21] Appl. No.: 754,248
[22] Filed: Aug. 26, 1991

Related U.S. Application Data

[63] Continuation of Ser. No. 463,459, Jan. 11, 1990, abandoned.

[51] Int. Cl.⁵ .............................................. B30B 9/00
[52] U.S. Cl. .................................... 100/88; 100/40; 100/45; 100/99
[58] Field of Search ............... 100/87, 88, 89, 46, 100/40, 45, 99, 50

[56] References Cited

U.S. PATENT DOCUMENTS

| | | | |
|---|---|---|---|
| 4,114,145 | 9/1978 | Farr | 340/626 |
| 4,224,867 | 9/1980 | Gaeddert et al. | 100/88 |
| 4,389,930 | 6/1983 | Rutschilling | 100/88 |
| 4,399,746 | 8/1983 | Viaud | 100/88 |
| 4,433,533 | 2/1984 | Giani | 56/341 |
| 4,517,795 | 5/1985 | Meiers | 56/341 |
| 4,633,659 | 1/1987 | Anstey et al. | 56/341 |
| 4,658,573 | 4/1987 | VanGinhoven | 56/341 |
| 4,702,066 | 10/1987 | Newendorp et al. | 56/341 |
| 4,707,974 | 11/1987 | Harthoorn | 56/341 |
| 4,729,304 | 3/1988 | Gardella et al. | 100/218 |
| 4,742,768 | 5/1988 | Sheehan et al. | 100/88 |
| 4,742,880 | 5/1988 | Schrag et al. | 177/136 |
| 4,748,801 | 6/1988 | Sheehan et al. | 56/341 |
| 4,748,802 | 6/1988 | Strosser et al. | 56/341 |
| 4,750,323 | 6/1988 | Sheehan et al. | 56/341 |
| 4,782,652 | 11/1988 | White | 56/341 |
| 4,858,497 | 8/1989 | Kouno | 74/866 |

Primary Examiner—Paul T. Sewell
Assistant Examiner—Thomas P. Hilliard
Attorney, Agent, or Firm—Andrus, Sceales, Starke & Sawall

[57] ABSTRACT

An apparatus and method for monitoring bale density in a round baler. A pair of hydraulic cylinders are operable to move a movable portion of the baler between its open and closed position. The bale density monitoring apparatus of the invention monitors pressure on the cylinders during bale formation. Upon sensing a differential in pressure between the cylinders, a signal is provided to the operator so that the tractor can be moved relative to the window to equalize pressure within the bale-forming chamber.

6 Claims, 1 Drawing Sheet

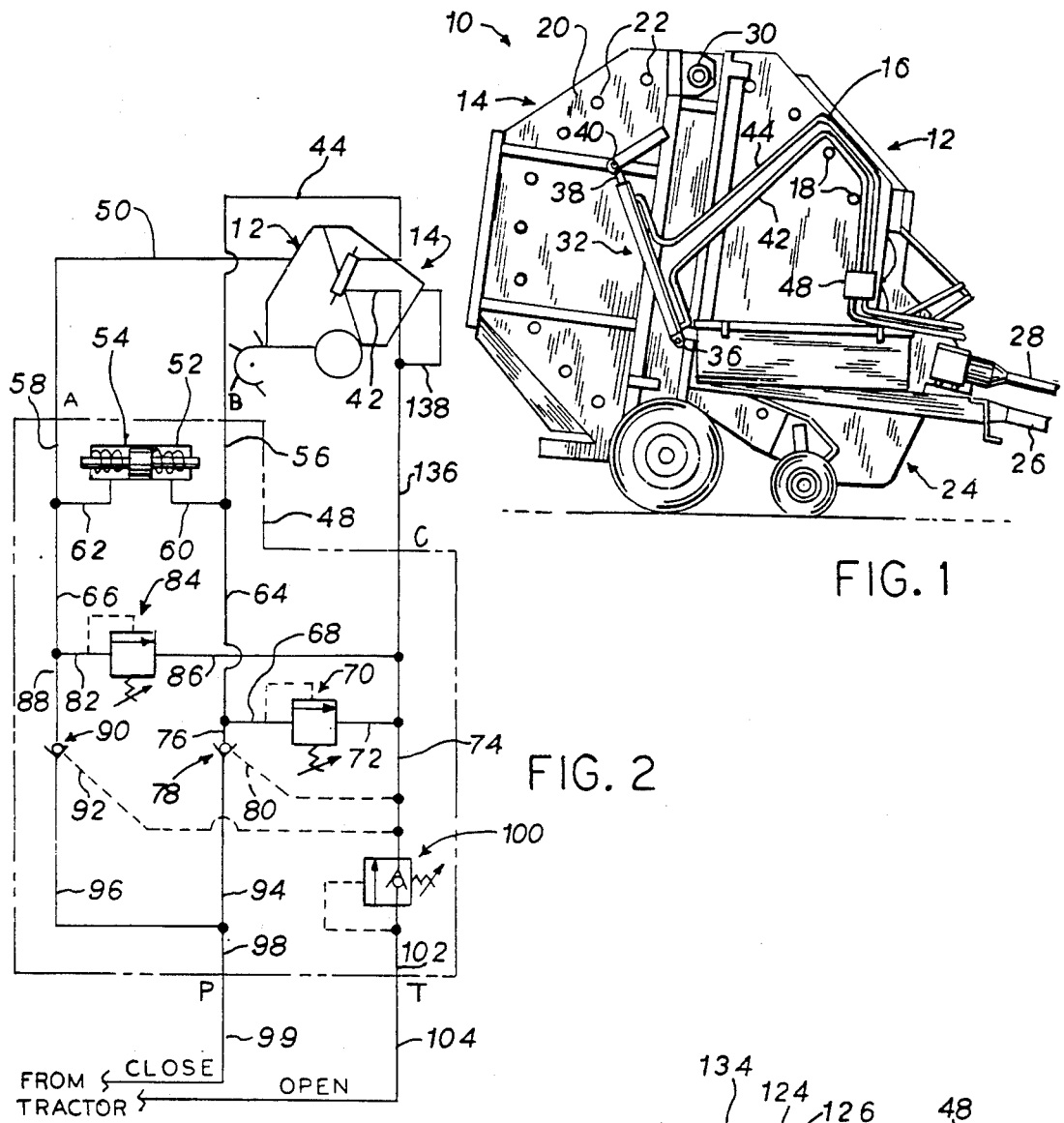
FIG. 1
FIG. 2
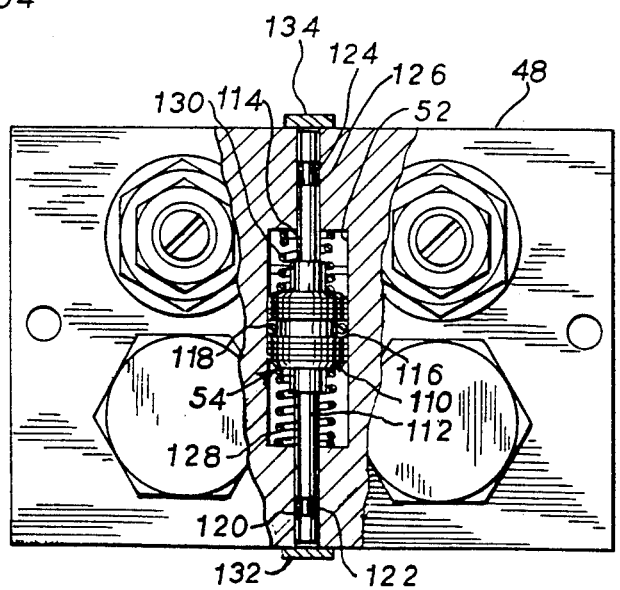
FIG. 3

BALE DENSITY MONITORING APPARATUS AND METHOD

This application is a continuation of application Ser. No. 07/463,459, filed Jan. 11, 1990, now abandoned.

BACKGROUND AND SUMMARY

This invention relates to forming of large round bales of crop material, and more particularly to an apparatus and method for monitoring the density of a large round bale during formation.

In forming large round bales of crop material in a baler having a width greater than that of the windrow of crop material, it is important to very the position of the baler relative to the windrow so as to insure uniform bale density and diameter throughout its width. If this is not done, the resulting bale attains an oblong shape, having a lesser density at it ends than at its center. Because of such non-uniform bale density, a bale so formed is difficult to work with and may result in more spoilage than a round bale having a uniform density throughout its width.

A common way to alleviate this problem is for the tractor driver to drive along the windrow in a zig-zag manner in an effort to supply crop material throughout the width of the bale-forming chamber. While this generally improves the shape of the bale, there is a need for a means to monitor the bale as it is being formed, to alert the driver that bale density in one area of the chamber exceeds that in another.

The present invention has as its object to assist the tractor driver in forming a bale having substantially uniform density throughout its width. Another object of the invention is to provide a bale density monitoring apparatus which is simple in design and construction, and which can easily be installed on a baler.

The invention is intended to be used on a baler having a first portion and a second portion defining an internal bale-forming cavity. At least one of the first and second portions is movable to an open position for discharging a formed bale from the cavity. Means is provided for maintaining the movable one of the first and second portions in a closed position during bale formation. The bale monitoring apparatus generally comprises means for sensing pressure exerted on the closing means at a pair of laterally spaced points during bale formation, and indicator means responsive to the sensing means for indicating the presence of a differential in pressure on the closing means at the pair of laterally spaced points. In a preferred embodiment, the movable one of the first and second portions is interconnected with the extendible rod of a hydraulic cylinder provided on each side of the baler, which acts to move the movable one of the first and second portions between its open and closed positions. The means for sensing pressure exerted on the closing means comprises a hydraulic fluid line connected to each one of the pair of hydraulic cylinders. A differential in pressure between the hydraulic cylinders is then sensed by sensing the fluid pressure in the hydraulic fluid lines. A spool member is slidably mounted in a cavity formed in a block and opposite ends of the cavity are exposed to hydraulic fluid pressure in the pair of hydraulic fluid lines. In this manner, when pressure in one of the hydraulic fluid lines exceeds pressure in the other, the spool member is caused to slide toward the end of the cavity having lesser pressure. A pair of activator rods are provided one on either side of the spool member, extending parallel to the direction of sliding movement of the spool member. Each activator rod is disposed within a passage extending from an end of the cavity and opening onto the exterior of the block. Sliding movement off the spool member causes the end of the activator rod to project exteriorly of the block, where it triggers a switch. This provides a signal to the driver to orient the baler on the windrow to supply crop material to the side of the baler having less pressure, so as to equalize pressure in the cylinders. Fluid pressure is preferably communicated from the tractor through the block to the cylinders. The sliding action of the spool member displaces a quantity of hydraulic fluid in the cavity, thereby increasing pressure, and the block preferably includes a pair of pilot operated relief valves arranged one in communication with each end of the cavity for relieving such pressure. The spool member is preferably biased toward a neutral or central position by a pair of springs, provided one on each side of the spool member.

The invention also contemplates a method of monitoring bale formation in a round baler, substantially in accordance with the foregoing summary.

BRIEF DESCRIPTION OF THE DRAWINGS

The drawings illustrate the best mode presently contemplated of carrying out the invention.

In the drawings:

FIG. 1 is a side elevation view of a fixed chamber round baler incorporating the bale density monitoring apparatus of the invention;

FIG. 2 is a schematic representation of the bale density monitoring apparatus of the invention; and FIG. 3 is a partial sectional view of the block in which the spool member of the bale density monitoring appratus is housed.

DETAILED DESCRIPTION OF THE PREFERRED EMBODIMENT

FIG. 1 illustrates a roller-type fixed chamber round baler constructed generally as described in U.S. Pat. No. 4,176,596, the disclosure of which is hereby incorporated by reference.

Baler 10 generally includes a stationary front portion 12 and a pivotable rear portion 14. Front portion 12 is defined by a pair of side panels, one of which is shown at 16, between which a series of rollers are mounted in an arcuate path to a series of shafts, such as shown at 18. Similarly, rear portion 14 is defined by a pair of side panels, one of which is shown at 20. A series of rollers are rotatably supported between the rear portion side panels by means of a series of shafts, such as shown at 22, mounted in an arcuate path. Front portion 12 and rear portion 14 cooperate to form an internal bale-forming cavity interiorly of the rollers mounted to each portion.

A pickup mechanism, shown generally at 24, is provided for picking up crop material from a windrow and feeding the crop material into the internal bale-forming cavity.

Baler 10 is adapted to be pulled behind a vehicle such as a tractor or the like by attachment of a tongue assembly 26 to a hitch attachment provided on the vehicle. A power take-off shaft 28 extends between baler 10 and the vehicle, for powering baler 10 during operation.

Rear portion 14 is mounted to front portion 12 for pivoting movement about an upper pivot bearing 30. In this manner, rear portion 14 is movable between an open position, for discharging a formed bale from the bale-forming cavity of baler 10, and a closed position as is shown in FIG. 1. A pair of hydraulic cylinders, one of which is shown at 32, are mounted to the sides of baler 10 for moving rear portion 14 between its open and closed positions.

Cylinder 32 includes a body portion 34 fixed at its lower end by a pin 36 to front portion 12, and a rod 38 connected to a piston housed within cylinder body portion 34, with the upper end of rod 38 being connected by a pin 40 to rear portion 14. As is known, supply of hydraulic fluid through a line 42 to the piston end of cylinder 32 results in extension of rod 38, and thereby movement of rear portion 14 to its open position. Supply of hydraulic fluid through line 44 to the rod end of cylinder 32 results in retraction of rod 38, and closing of rear portion 14. When rear portion 14 is moved to its fully closed position, cylinder 32 acts to lock rear portion 14 in its closed position during bale formation.

FIG. 2 schematically illustrates the bale density monitoring apparatus of the invention. Where possible, like reference characters will be utilized to facilitate clarity. As shown in FIG. 2, hydraulic fluid line 44 communicates rod side pressure from cylinder 32 to a block 48. In a similar manner, a line 50 communicates rod side fluid pressure from the hydraulic cylinder on the other side of baler 10 to block 48. Block 48 is provided with an internal cavity 52, within which is mounted a spool member 54. Fluid pressure from lines 44, 50 is communicated to lines 56, 58, respectively, formed in block 48. A pair of lines 60, 62 communicate fluid pressure from lines 56, 58, respectively, to opposite ends of cavity 52.

A line 64 is connected at the juncture of lines 56 and 60, and likewise a line 66 is connected at the juncture of lines 58 and 62. Line 64 is in communication with a line 68, within which is disposed a pilot operated relief valve 70. A line 72 is disposed downstream of relief valve 70, and is in communication with a line 74.

A line 76 connects at the juncture of lines 64 and 68, and a pilot operated check valve 78 is disposed in line 76, with a pilot line 80 extending between check valve 78 and line 74.

In a similar manner, a line 82 connects to line 66, and is in communication with a pilot operated relief valve 84. A line 86 is disposed downstream of relief valve 84, and connects to line 74. A line 88 connects to the juncture of lines 66 and 82, and a pilot operated check valve 90 is provided in line 88, with a pilot line 92 extending between check valve 90 and line 74.

A line 94 is in communication with check valve 78, and a line 96 is in communication with check valve 90. Lines 94, 96 merge into a line 98, which is connected to the tractor hydraulic system via a line 99.

A pilot operated relief valve 100, including an internal check valve, is disposed in line 74 between the exterior of block 48 and the connection of lines 72, 86 and pilot lines 80, 92 to line 74. A line 102 extends between relief valve 100 and the exterior of block 48, and is connected to the tractor hydraulic system via a line 104.

Referring to FIG. 3, it is seen that spool member 54 includes a central portion 110 and a pair of actuator rods 112, 114 extending therefrom. Actuator rods 112, 114 extend along the longitudinal axis of spool member 54, which coincides with the longitudinal axis of cavity 52 formed in block 48.

Central portion 110 includes a circumferential groove 116, within which is disposed an O-ring 118, which acts to isolate one side of cavity 52 from the other. Actuator rod 112 includes a groove 120, within which is disposed an O-ring 122 which seals cavity 52 from the exterior of block 48. Similarly, actuator rod 114 is provided with a groove 124 and an O-ring 126, which performs the same function.

A spring 128 is provided about actuator rod 112, and bears between the end of cavity 52 and one side of spool member central portion 110. Likewise, a spring 130 bears between the other end of cavity 52 and the other side of spool member central portion 110. Springs 128, 130 act to urge spool member central portion 110 toward a central position within cavity 52.

A switch actuator arm, shown in cross section at 132, is disposed against the side of block 48 at the opening of the passage within which actuator rod 112 is housed onto the outer surface of block 48. Similarly, a switch actuator arm 134 is provided on the other side of block 48 at the opening of the passage within which actuator rod 114 is housed onto the exterior of block 48. Switch actuator arms 132, 134 may be such as is provided on a switch as marketed by Cherry Electrical Products Corporation of Waukegan, Ill. under its designation E22.

In operation, the above-described system functions as follows. In order to move baler rear portion 14 to its closed position, hydraulic fluid pressure is supplied from the tractor hydraulic fluid system through line 99 to block 48. Pressurization of line 99 results in supply of hydraulic fluid pressure to lines 44, 50, which closes the hydraulic cylinders associated with baler 10 so as to maintain rear portion in its closed position.

As the bale is being formed within the internal bale-forming cavity, and after it grows to a diameter sufficient to exert pressure on the rollers defining the bale-forming cavity, the hydraulic fluid cylinders maintaining rear portion 14 closed experience a force tending to extend the piston rods associated with each cylinder, due to a tendency of the growing bale to move rear portion 14 toward its open position. This exertion of pressure in the hydraulic fluid cylinders causes pressure to be experienced in lines 44, 50, which is communicated to cavity 52 through lines 56, 58. If a differential in pressure exists between the cylinders on either side of the baler, spool member 54 will move within cavity 52 toward the side having lesser pressure. This movement of spool member 54 results in axial movement of actuator rods 112, 114. When a certain amount of movement of one of the actuator rods occurs, the end of the actuator rod will project exteriorly of block 48 and into contact with one of the switch actuator arms 132, 134. Through the switch, a signal is provided to the tractor operator indicating that one side or the other of baler 12 has greater pressure. The operator can then steer baler 10 accordingly so as to equalize the pressure in the cylinders. As long as equal pressure in the cylinders is maintained, spool member 54 is biased toward its central position where no signal to the operator is provided.

Pressure relief valves 70, 84 act to insure that a predetermined amount of pressure is not exceeded during bale formation. If this occurs, then the valve moves to its open position so as to relieve excess pressure. Check valves 78, 90 act to isolate the opposite sides of cavity 52.

After bale formation, when it is desired to move rear portion 14 to its open position, fluid pressure is supplied through line 104 from the tractor hydraulic system. This supply of fluid pressure moves relief valve 100 to its open position, so as to allow hydraulic fluid to pass through line 74 to a line 136, which communicates fluid pressure to the piston end of the cylinders through line 42 and a line 138.

The supply of hydraulic fluid pressure to line 74 provides pilot pressure through lines 80, 92 to check valves 78, 90, so as to open check valves 78, 90 and allow hydraulic fluid to pass therethrough to the tractor hydraulic fluid system.

Various alternatives and embodiments are contemplated as being within the scope of the following claims particularly pointing out and distinctly claiming the subject matter regarded as the invention.

I claim:

1. A baler for forming round bales of crop material, comprising:
    a first baler portion and a second baler portion, wherein one of the baler portions is movable between a closed position in which the first and second baler portions cooperate to define an internal bale-forming cavity, and an open position for discharging a formed bale from the bale-forming cavity;
    an opening and closing mechanism interconnected with the movable baler portion at a pair of laterally spaced points, wherein pressure is exerted on the opening and closing mechanism during formation of a bale within the bale-forming chamber, said opening and closing mechanism comprising a pair of hydraulic cylinders mounted one on each side of said baler, said cylinders being extendible and retractable for moving the movable baler portion between its open and closed positions, said hydraulic cylinders maintaining the movable baler portion against movement in its closed position during bale formation;
    a pressure differential sensing mechanism interconnected with the opening and closing mechanism for sensing a differential in pressure exerted on the opening and closing mechanism at the pair of laterally spaced points during bale formation, comprising a hydraulic fluid line connected to each of said hydraulic cylinders and means interconnected with said pair of hydraulic fluid lines for detecting a differential in pressure between said hydraulic fluid lines, and thereby between said pair of cylinders; and
    an indicator responsive to the pressure differential sensing mechanism for indicating the presence of a differential in pressure at the pair of laterally spaced points during bale formation.

2. The baler of claim 1, wherein said means interconnected with said pair of lines for detecting a differential in pressure comprises a spool member slidably disposed within a cavity, with the opposite ends of said cavity being exposed to hydraulic fluid pressure in said pair of lines, so that when pressure in one of said lines exceeds pressure in the other of said lines, said spool member is caused to slide toward the end of said cavity of lesser pressure, and wherein said indicator means is responsive to the sliding movement of said spool member within the cavity.

3. The baler of claim 2, wherein said spool member is movable within the cavity to a neutral position when the differential in pressure is insufficient to actuate the indicator, and further comprising bias means for urging said spool member toward the neutral position within said cavity.

4. A method of monitoring bale formation in a round baler, said bailer including a first baler portion and a second baler portion, wherein one of the baler portions is movable between a closed position in which the first and second baler portions cooperate to define an internal bale-forming cavity, and an open position for discharging a formed bale from the bale-forming cavity; and an opening and closing mechanism interconnected with the movable baler portion at a pair of laterally spaced points, wherein said opening and closing mechanism includes a pair of laterally spaced hydraulic cylinders for maintaining the movable one of said first and second baler portions in its closed position against movement during bale formation, including an extendible portion for moving the movable one of said first and second portions between its open and closed positions, wherein pressure is exerted on the opening and closing mechanism during formation of a bale within the bale-forming chamber; sand method comprising the steps of:
    sensing the presence of a differential in pressure exerted on the opening and closing mechanism at the pair of laterally spaced points during bale formation by sensing internal pressure in said cylinders during bale formation; and
    indicating the presence of a differential in pressure at the pair of laterally spaced points during bale formation.

5. The method of claim 4, further comprising the steps of providing a cavity, slidably mounting a spool member within said cavity, and placing said cylinders in communication with opposite ends of said cavity with said spool member being disposed therebetween so that the ends of said spool member are exposed to fluid pressure from said cylinders, with a differential in fluid pressure in said cylinders causing sliding movement of said spool member within said cavity.

6. The method of claim 5, wherein the step of indicating the presence of a pressure differential comprises providing a signal responsive to the sliding movement of said spool member.

* * * * *